June 19, 1928.　　　　　　　　　　　　　　　　　　1,674,224
C. RABUT
GRINDING MACHINE
Filed Feb. 26, 1923　　　　2 Sheets-Sheet 1
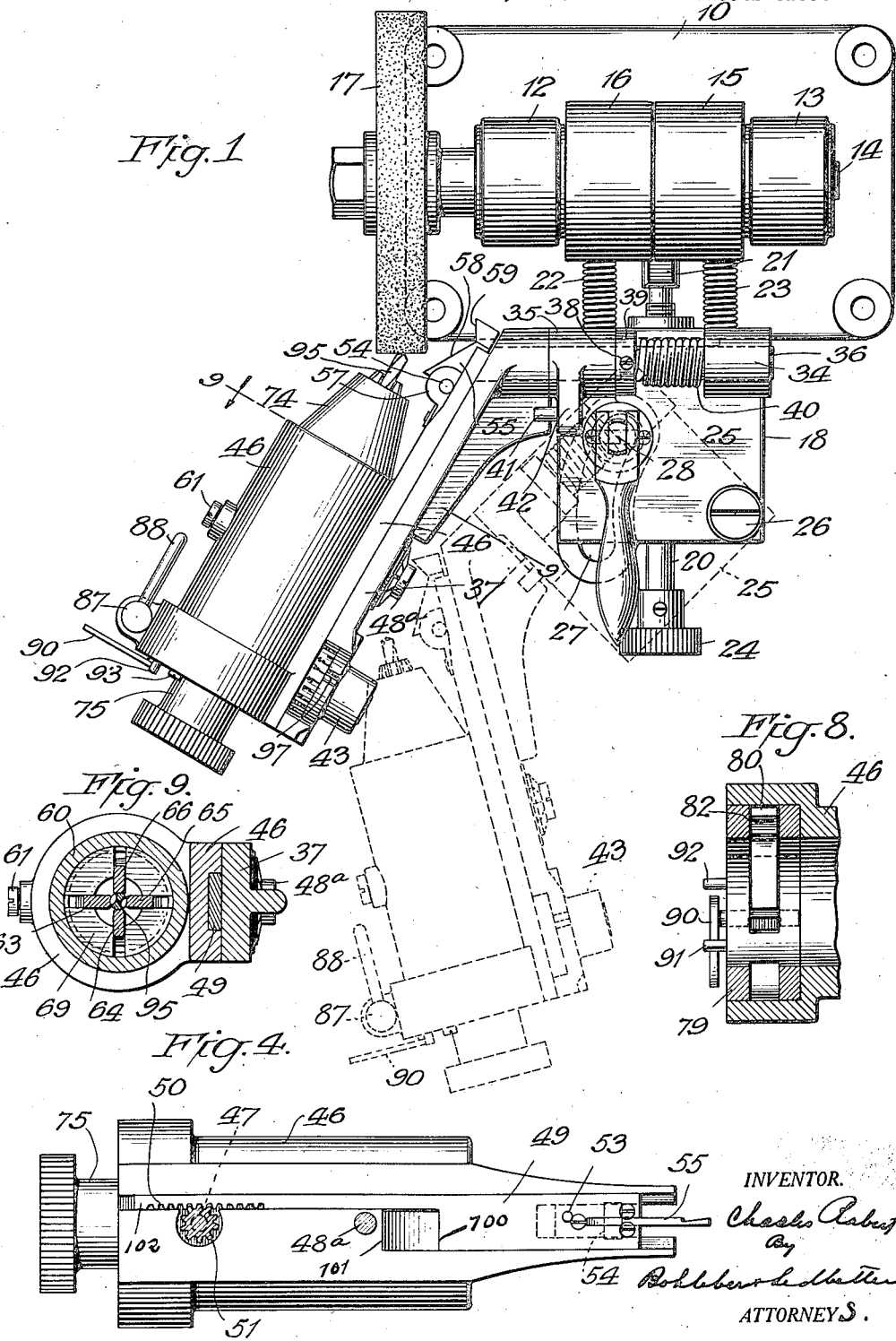
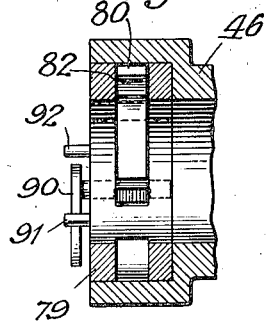
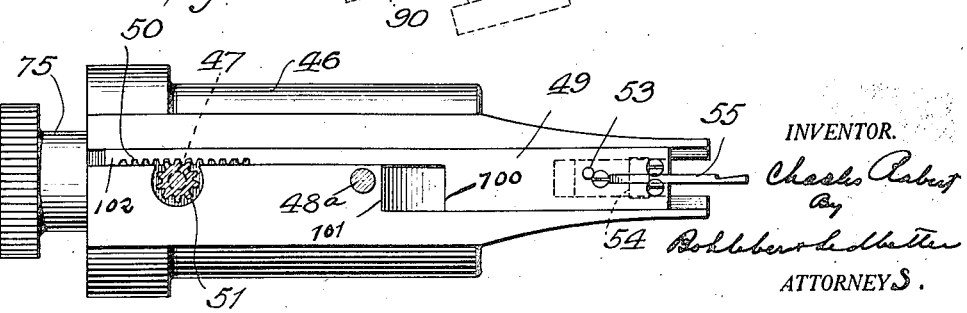
INVENTOR.
Charles Rabut
By
Bohleber & Ledbetter
ATTORNEYS.

June 19, 1928.　　　　　C. RABUT　　　　　1,674,224
GRINDING MACHINE
Filed Feb. 26, 1923　　　2 Sheets-Sheet 2
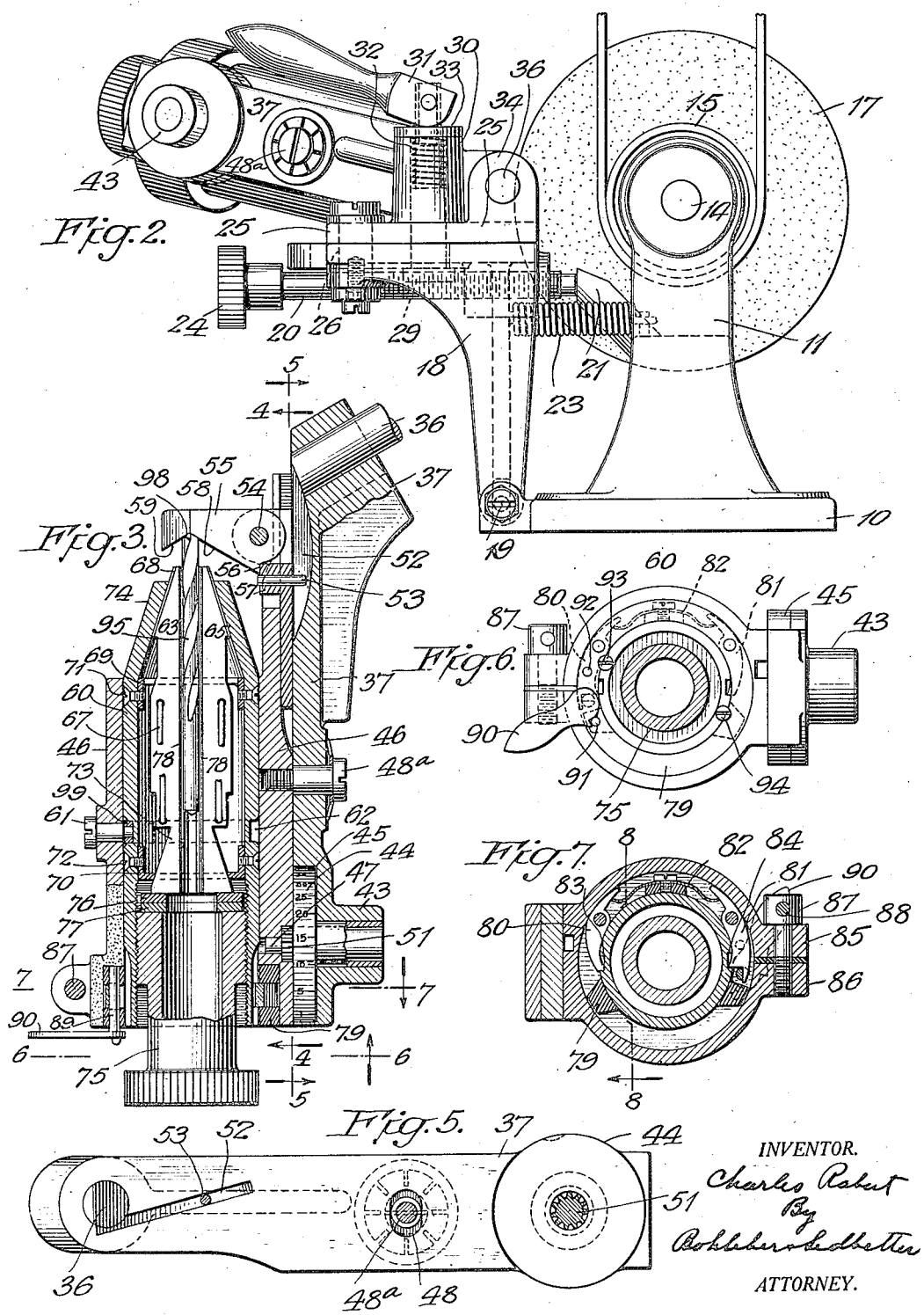

Patented June 19, 1928.

1,674,224

UNITED STATES PATENT OFFICE.

CHARLES RABUT, OF NEW YORK, N. Y.

GRINDING MACHINE.

Application filed February 26, 1923. Serial No. 621,449.

In my copending application, Serial No. 425,035, filed November 19, 1920, now Patent 1,524,672, I have illustrated, described and claimed an improved grinding apparatus equipped with a novel chuck more particularly designed and constructed for holding twist drills, the chief object of the invention claimed in that application is to provide an apparatus for grinding drills and similar tools of small sizes. The copending application just referred to is directed specifically to the drill grinding apparatus comprising, briefly, a rotatable grinder, a frame adjustable towards and away from the grinder, and a chuck-carrying arm pivoted on said frame and extending outwardly at an angle to the axis of rotation of the grinder in combination with means for supporting a drill chuck on said arm for bodily rotation about its longitudinal axis, and also for bodily rotation about a second axis arranged at an angle to its longitudinal axis of rotation.

In my copending application, Serial No. 611,013, filed January 6, 1923, which is a division of my copending application, Serial No. 425,035, I have specifically described and claimed the improved chuck originally illustrated and described in the latter. This chuck is of more or less general application, but is particularly designed to be employed for holding twist drills of small sizes. One of the more important objects of that invention, however, is to provide a chuck which is not only simple in construction but which will hold drills or similar devices to be ground as small as one-sixty-fourth of an inch in diameter, so that they may be ground theoretically correct by any unskilled person.

My present invention is an improvement upon the inventions illustrated, described and claimed in my copending applications above referred to, and one of the objects of which is to provide a chuck-holding apparatus, which enables the chuck itself to be moved toward and away from the grinding device about a vertical axis; that is to say, it is movable in a horizontal direction. This enables the drill to be inserted into the chuck from the front end thereof without the necessity of removing said chuck for that purpose. Another of the more important features of this invention consists in providing improved mechanism carried by the chuck holder and chuck and cooperating with a suitable gauge for enabling the chuck to be properly adjusted angularly after the work has been gripped, thus enabling the drill to be accurately positioned relative to the spiral ribs thereon, for grinding purposes; said mechanism also including means to enable the chuck to be moved through predetermined angles from its adjusted position, after said adjustment has been made for grinding different portions of the drill point. Another important feature of the present invention consists in the provision of improved mechanism on the chuck and the chuck-holding arm which will enable the proper longitudinal adjustment of a gauge and simultaneously effect the proper elevation of the drill point. In addition to the specific securing means which enables the chuck-holding arm to be moved in a horizontal direction toward and away from the grinding wheel there is also provided suitable mechanism for clamping or securing said carrier in an operatively fixed position to prevent its movement in a horizontal plane about its vertical axis as a center. Furthermore, in conjunction with this mechanism there is provided further mechanism for moving the chuck towards the grinding wheel as the grinding operation proceeds.

Other objects, features and advantages of my invention will more fully appear from the detailed description taken in connection with the accompanying drawings, in which:

Fig. 1 is a top plan view of the grinding machine;

Fig. 2 is an end view of the machine;

Fig. 3 is a longitudinal section of the chuck, chuck holder and chuck-supporting arm;

Fig. 4 is a section taken on the line 4—4 of Fig. 3;

Fig. 5 is a section taken on the line 5—5 of Fig. 3;

Fig. 6 is a section taken on the line 6—6 of Fig. 3;

Fig. 7 is a section taken along the line 7—7 of Fig. 3;

Fig. 8 is a section taken along the line 8—8 of Fig. 7; and

Fig. 9 is a section taken on line 9—9 of Fig. 1.

Referring to the drawings in detail, reference numeral 10 designates the base of the machine adapted to be bolted or otherwise anchored to any suitable support (not shown) and provided with one or more standards 11 equipped with bearing members 12 and 13. Within these bearing members is supported a shaft 14 upon which is mounted a loose belt pulley 15, a fixed belt pulley 16 and a grinding wheel 17, the construction, arrangements and operation of which will be readily understood by the ordinary mechanic.

Pivotally mounted on the base 10 is a frame 18 (see Fig. 2) adjustable about its pivot 19 towards and away from the grinder 17. Screw-threaded to this frame is an adjusting rod 20 normally held in engagement with an abutment 21 by means of the springs 22 and 23, (see Fig. 2). From the preceding description it will be readily apparent by the operation of a milled wheel 24 on the outer end of the rod 20 that the frame 18 may be moved about the pivot 19 toward or away from the grinder.

The pivoted frame 18 is preferably provided with a flat upper surface adapted to support a carrier 25 so pivoted as to enable the carrier to rotate about a vertical axis. In other words, the carrier is adapted to be moved, under certain conditions, in a substantially horizontal plane about said pivot as a center. This pivot is indicated at 26 and is preferably located at one of the corners of the upper surface of the frame 18 and also on the corresponding corner of the carrier 25. The frame 18 is equipped with an arcuate slot 27 (see Fig. 1) through which the securing pintle 28 passes. This pintle is provided upon its lower end with a head 29 and projects upwardly through the slot 27 and through the tubular boss 30 located on the carrier 25. This pintle is carried by the tubular boss 30, so that when movement is imparted to the carrier 25 the pintle will be carried with it. To the upper end of the pintle is pivoted a camming lever 31. When this lever 31 is in the position indicated in full lines in Figs. 1 and 2, it will exert an upward pull upon the pintle 28, thereby rigidly clamping or securing the frame 18 and carrier 25 against relative movement. The pintle 28 is offset or rather reduced at its upper portion, thus providing a shoulder thereon and a space between the reduced portion of the pintle and the tubular boss 30. Located within this space is a spring 32, one end of which abuts against the shoulder and the other end of which abuts against a washer 33 secured to the upper end of the tubular boss 30. It will be clear on a casual inspection of the drawing (see Fig. 2) that when the camming lever 31 is moved towards a vertical position the spring 32 tends to force the pintle 28 downwardly, thus removing the clamping action between the frame 18 and the carrier 25 and thereby enabling one to be moved relative to the other around the pivot 26 as a center.

The carrier 25 is provided with two bearing members 34 and 35, in which is suitably journalled a shaft 36 upon which the chuck-carrying arm 37 is mounted. Secured upon the shaft 36 as by a screw 38 is a washer 39. Interposed between this washer and the bearing member 34 is a coil spring 40, one end of which is secured in the washer 39 and the other end of which projects downwardly through a perforation in the top of the carrier 25. The construction and arrangement of the mechanism just described is such that the spring 40 maintains the arm 37 normally in contact with the stud 41 projecting laterally from an arm 42 on the bearing member 35. It will therefore be clear that when the chuck-carrying arm 37 is moved downwardly the spring 40 is put under tension, thus enabling said arm to be automatically returned to normal position in engagement with the stud 41. By adjusting the washer 39 longitudinally of the shaft 36 the drill point may be made to contact with different peripheral portions of the grinding wheel 17. The same result may be accomplished by adjusting the frame 18 laterally on its pivot shaft 19 as will be understood.

The arm 37 is provided with a boss 43 in which is journalled an index wheel 44, the outer periphery of which is provided with indices to indicate the adjustment to be made for the various sizes of drills to be ground. This index wheel is located in a depression 45 of said arm 37 in such a way that the side thereof opposite to the boss 43 is flush with the outer flat surface of the arm 37. The chuck itself is mounted in a holder 46. This holder is pivoted at 47, said pivot constituting preferably an extension of the index wheel 44. The arm 37 is provided with a slot 48 (see Fig. 5) through which the stud 48ª passes into screw-threaded engagement with the casing 46. This stud 48ª, as will be readily apparent from an inspection of Figs. 3 and 5, guides the movement of the holder 46 about the pivot 47 as a center.

Interposed between the flat surface of the arm 37 and the chuck holder 46 is a slidable member 49 provided with a rack 50 thereon, which is in constant engagement with a pinion 51 mounted upon or integral with the pivot 47. The slidable member 49, as clearly illustrated in Fig. 4, has only a longitudinal movement with respect to the holder 46. The arm 37 is provided with a cam slot 52 in which a pin 53 projecting from the slide 49 engages. It will, therefore, be seen that upon the operation of the index wheel 44 a longitudinal movement is imparted to the slidable member 49 through the rack 50 and pinion 51. If the slide is moved in the direction of the grinding wheel the engagement of the pin 53 with the slot 52 will cause the forward end of the slide to be cammed downwardly, carrying with it the chuck holder 46. On the other hand, if the slidable member 47 is moved in the opposite direction through the rack 50 and pinion 51 the forward end of the chuck holder 46 will be elevated around the pivot 47 as a center. As before stated, the screw-threaded stud 48ª guides the movement of the elevation and depression of the chuck holder 46. Pivoted at 54 upon the forward end of the slidable member 49 is a gauge 55, the normal position of which is clearly illustrated in Fig. 1, and the operative position of which is clearly illustrated in Fig. 3 at substantially right angles to the slidable member 49. In operative position the shoulder 56 of the gauge 55 abuts against the member 57 upon which it is pivotally mounted. The gauge 55 is provided with inclined surfaces 58 and 59, so constructed, arranged and related to the drill point as to enable the latter to be readily adjusted angularly for the grinding operation, as clearly indicated in Fig. 3.

From the foregoing it will be readily apparent that I have provided a simple device which, when operated, will not only permit the proper positioning of the gauge 55 in accordance with the size of the drill being ground, but will also effect the proper elevation of the forward end of the chuck so as to provide the proper clearance for the point of said drill.

The chuck proper, as previously stated, is rotatably mounted in the chuck holder 46. The reference numeral 60 designates the casing of the chuck normally held against longitudinal movement in the chuck holder 46 by means of the screw 61, the inner end of which engages in a circumferential groove 62 of the casing 60. It will therefore be seen that everything else being equal, this screw and circumferential groove arrangement permits the chuck to be rotated about its axis in the holder 46. The chuck is provided with a plurality of jaws 63, 64, 65, and 66 which tend to separate from each other under the action of the springs 67. As indicated at 68, these jaws are suitably bevelled at their forward ends in parallel directions and are held apart from each other at uniform distances by means of two washers 69 and 70, suitably secured as by set screws 71 and 72, to the inner wall of the chuck casing 60. The washers are provided with slots in which the jaws are free to slide bodily in preferably radial directions. It is clearly indicated at 73 that the rear ends of the jaws are also bevelled and coact with the slots in the washer 70, while the forward bevelled ends of the jaws preferably coact with the interior conical portion 74 of the casing 60, thereby causing the drill to be tightened when the screw plug 75 is rotated to press against the rear end of the jaws through the interposed washers 76 and 77 In order to reduce friction, one of the washers is preferably made of fibre.

The washers 69 and 70 are removably secured to the casing 60 of the chuck, as previously stated. Upon the removal of the screw plug 75 and the set screws 71 and 72, the jaws 63, 64, 65 and 66, washers 69 and 70, and springs 67 may be removed bodily from the sleeve of the chuck. As will be seen from Fig. 3, the jaws are provided with continuous work-engaging surfaces 78 arranged parallel to one another, whereby in operation the drill is engaged or rather clamped throughout its entire length. This is important, as it does away with breakage of drills, which necessarily occurs where the latter are engaged only at separated points. The surfaces 78 of the jaws are maintained in parallelism by virtue of the fact that the surfaces with which they engage are so shaped or constructed that the respective ends of the jaws are carried inwardly at the same speed. The surfaces 78 are so shaped as to approach very close to or even contact with one another, with the result that drills or similar devices of the smallest diameter may be gripped and held thereby.

As previously stated, the member 75 in operative position is adjustable in the casing 60 so as to effect a lateral movement of the jaws with respect to the chuck casing. Interposed between the sleeve 60 of the chuck and the chuck holder 46 is a sleeve member 79 which carries two pivoted spring-pressed pawls 80 and 81. The spring itself indicated at 82 is also carried by the sleeve member 79. The outer periphery of the rear end of the chuck casing is provided with two longitudinal grooves 83 and 84 arranged diametrically opposite to each other and adapted to be engaged by the spring-pressed pawls 80 and 81. The sleeve member 79 fits snugly within a groove of the chuck holder 46, so that when the split ends 85 and 86 are drawn towards each other, as by the bolt 87 and handle 88, the sleeve 79 is held rigid against relative rotation with respect to the holder. The sleeve 79 carries a cam member 89 (see Fig. 3), the outer end of which is provided with an operating lever 90, such that when the lever is in the position indicated in Fig. 6, that is, resting against the stop 91, the pawl 81 is withdrawn from the groove 84, thus enabling the chuck 60 to be rotated in one direction. This sleeve, however, is held against rotation in the opposite direction by the engagement of pawl 80 in the groove 83. When the lever 90, however, is in its other extreme position, resting against the stop 92, both the pawls 80 and 81 engage the respective grooves 83 and 84, thereby preventing rotation of the sleeve 79 in either direction relative to the chuck casing 60. Consequently, if the bolt 87 is tightened the sleeve 79 is prevented from rotation in either direction, and the screw-threaded member 75 can be tightened or loosened as desired, thereby permitting the proper positioning of the drill within the chuck. When the drill has been properly positioned against the gauge 55 the lever 90 is again thrown in the reverse direction against the stop 91, thus leaving the parts in the proper position for effecting the grinding operations. The sleeve 79 is held in position against removal by means of the screws 93 and 94 mounted in the sleeve 60 of the chuck.

The operation of inserting, grinding and removal of the drill from the chuck is as follows: To insert a drill 95 the carrier is swung from the full line to the dotted line position indicated in Fig. 1. In the position of the operating handle 88 indicated in Fig. 1, the sleeve member 79 is locked against rotation and the lever 90 is in engagement with the stop 92 with the pawls 80 and 81 in engagement with the grooves 83 and 84, thus locking the sleeve 60 of the chuck against rotation in either direction. Assuming that the jaws of the chuck are already separated sufficiently to receive the drill to be ground the latter is inserted into the chuck. Immediately before or immediately after such insertion, the index wheel 44 is so adjusted that the graduation 96 thereon, which corresponds to the size of the drill being inserted, is positioned in alignment with the mark 97 on the arm 37. This not only serves to effect the proper elevation of the chuck holder and chuck, but also to effect the proper adjustment of the gauge 55. The latter is now moved to the position shown in Fig. 3. The drill point is then caused to engage the inclined surfaces 58 and 59 of the gauge. The drill is now in position for engagement by the jaws of the chuck and this is effected by a right-handed manipulation of the member 75. If the cutting edge 98 of the drill is not exactly parallel to the inclined surface 59 of the gauge 55, which is rarely the case, except with very small drills, the bolt 87 is loosened by the manipulation of the handle 88 thus enabling the chuck 60, sleeve member 79, pawls 80 and 81 and drill 95 to be operated in unison in either direction of rotation. The chuck is now rotated backward or forward as the case may be until one of the cutting edges 98 of the drill is parallel to or rather in alignment with the upper edge of the inclined surface 59 of the gauge 55, after which the bolt 87 is tightened, thus locking the member 79 against further rotation. At this juncture, the gauge 55 is moved to its inoperative position clearly indicated in Fig. 1. The carrier is now moved to normal operating position indicated in full lines in Fig. 1, and clamped to the frame 18. The lever 90 is now thrown to its other extreme position against the stop 91 thereby withdrawing the pawl 80 from the groove 83 after which the chuck is free to be rotated in one direction by means of the handle 75. The grinding of the drill may now be effected by turning the screw 24 to bring the drill in contact with the emery wheel and merely depressing the chuck holder about the axis of the shaft 34. The chuck is rotated one-half turn and the chuck holder depressed to grind the other side of the drill. This operation of grinding the sides of the drill may be repeated several times, if desired. The lever 90 is brought back against the stop 92 to clamp the chuck.

Assuming that the lever 90 is in engagement with the stop 92 it will be readily apparent that the drill 95 may be removed by unclamping the carrier from the frame, moving said carrier to the dotted line position indicated in Fig. 1, and retracting the jaws of the chuck by imparting a left-handed turn to the member 75. The upward movement of the chuck holder about the pivot 47 is preferably limited by the engagement of shoulder 100 on the slidable member 49 with the shoulder 101 on the chuck holder 46, and the downward movement of the chuck holder is preferably limited by the engagement of the untoothed portion 102 of the rack 50 with the pinion 51.

Once the chuck is assembled in the holder, it is rarely necessary to remove the same except for demonstration purposes. Should this be necessary or desirable for any reasons, this can be done by simply removing the screw 61. This screw does not engage directly with the groove 62 but instead with the arcuate member 99 located within said groove. This member extends about one-third the way around the groove 62 and is provided with a perforation adapted to be engaged by the screw 61. In withdrawing the chuck, the noses of the pawls 80 and 81 will necessarily drop into the annular groove 62, but the pawls may be suitably bevelled so as to be readily cammed out of said groove. Of course, if the sleeve 79 is removed at the same time, this matter is of no relative importance.

From the foregoing it will be seen that I have devised a simple form of grinding machine to take care in an expeditious manner of all of the necessary operations incident to grinding twist drills and similar articles. I have illustrated what I now regard as the best embodiment of my invention. In such a machine which serves so many functions and which has a number of parts for accomplishing the objects sought, it is to be understood that many changes may be made in points of detail and other embodiments resorted to. I therefore do not limit myself to the embodiment of my invention illustrated and described herein.

What I claim is:

1. In a drill grinding apparatus, a rotatable grinder, a frame adjustable towards and away from the grinder, a carrier pivoted to said frame, and a chuck carrying arm pivotally connected to said carrier and extending outwardly at an angle to the axis of rotation of said grinder, in combination with means for supporting a drill chuck on said arm, said means comprising a member in which the chuck is mounted to rotate about its own axis, means for locking said chuck against reverse rotation in any predetermined position, and means for movably connecting said member to said arm to vary the angle of the cutting lip of the drill.

2. In a drill grinding apparatus, a rotatable grinder, a frame adjustable towards and away from the grinder, a carrier pivoted to said frame, and a chuck carrying arm pivotally connected to said carrier and extending outwardly at an angle to the axis of rotation of said grinder, in combination with means for supporting a drill chuck on said arm, said means comprising a member in which the chuck is mounted to rotate about its own axis, means for pivotally connecting said member to said arm, an index means pivoted to said arm to indicate the angle to be given to the cutting edge of the drill, and means actuated by the index means and engaging said member to move the latter about its pivot.

3. In a drill grinding apparatus, a rotatable grinder, a frame adjustable towards and away from the grinder, and a chuck carrying arm pivotally connected to said frame and extending outwardly at an angle to the axis of rotation of said grinder, in combination with means for supporting a drill chuck on said arm comprising a member in which the chuck is removably mounted to rotate about its longitudinal axis, means for pivotally connecting said member to said arm to rotate the same about a second axis arranged at an angle to the longitudinal axis of the chuck, and means for rotating said chuck about a second axis comprising a movable device carried by said member and provided with means thereon for operatively engaging said arm, and an index means pivoted to said arm and adapted to actuate said movable device.

4. In a drill grinding apparatus, a rotatable grinder, a frame adjustable towards and away from said grinder, a chuck carrying arm pivoted to said frame, a chuck holder pivotally supported on said arm, a chuck rotatably mounted in said holder, and means for properly positioning the chuck holder about its pivot and for properly positioning the drill in said chuck comprising a movable device carried by said holder and operatively connected to said arm, a gauge carried by said device and index means for actuating said device for moving said holder about its pivot and for bringing the gauge into proper position with respect to the chuck.

5. A drill grinding apparatus, comprising a chuck holder, a chuck rotatably mounted in said holder, a plurality of work holding jaws mounted in said chuck, means carried by said chuck for imparting a movement of said jaws towards and away from one another, a sleeve rotatably mounted in said holder, means normally in unlocked position for locking said sleeve and chuck against movement relative to each other to enable the chuck to be angularly adjusted, and means for normally locking said sleeve against rotation with respect to the holder whereby the jaw actuating means may be operated when the first mentioned locking means is in locked position to grip and ungrip the work and whereby the chuck may be rotated through a predetermined angle when the first mentioned locking means is in unlocked position for grinding different portions of the drill point.

6. A drill grinding apparatus, comprising a chuck holder, a chuck rotatably mounted in said holder, a plurality of work holding jaws mounted in said chuck, means carried by said chuck for imparting a movement to said jaws towards and away from one another, mechanism carried by said holder and said chuck to lock the latter from rotation in either direction whereby the said means may be operated to move the jaws towards and away from one another to grip and ungrip the work, said mechanism also including means for enabling the chuck to be adjusted angularly after the work has been gripped, and also including means to enable the chuck to be moved through predetermined angles after said adjustment has been made.

7. A drill grinding apparatus comprising a chuck holder, a chuck rotatably mounted in said holder, a plurality of work holding jaws mounted in said chuck, means carried by said chuck for imparting a movement to said jaws towards and away from one another to grip and ungrip the work, and mechanism carried by said holder and chuck for enabling the chuck to be adjusted angularly after the work has been gripped, said mechanism also including means to enable the chuck to be moved through predetermined angles from its adjusted position after said adjustment has been made for grinding different portions of the drill point.

8. In a drill grinding apparatus, a rotatable grinder, a frame adjustable towards and from the grinder, a carrier pivoted to said frame, a chuck carrying arm pivoted to said carrier, a chuck, means carried by said arm for supporting said chuck at an angle to the axis of rotation of the grinder for giving the desired angle to the cutting edge of the drill and for bodily rotation about an axis arranged at an angle to the plane of rotation of the grinder to vary the slope to be given to the cutting lip of the drill.

9. In a drill grinding apparatus, the combination with a grinding wheel and its axis of an arm swingable about an axis which is parallel to the axis of the wheel, said arm being arranged at an angle to the axis about which it swings and extending transversely across the plane of rotation of the wheel, an elongated chuck-holder supported by the arm alongside the same, a pivotal connection between those extremities of the arm and holder most remote from the axis about which the arm swings whereby the end of the holder nearest the last-mentioned axis may be moved upwardly and downwardly with respect to the same, and a chuck turnably supported in said holder.

10. In a drill grinding apparatus, the combination with a grinding wheel and its axis of an arm swingable about an axis which is parallel to the axis of the wheel, said arm being arranged at an angle to the axis about which it swings and extending transversely across the plane of rotation of the wheel, an elongated chuck-holder supported by the arm alongside the same, a pivotal connection between those extremities of the arm and holder most remote from the axis about which the arm swings whereby the end of the holder nearest the last-mentioned axis may be moved upwardly and downwardly with respect to the same, means for moving the holder about its pivot to the desired angle to be given to the cutting edge of the drill to be ground, and means associated with the holder for securing the drill to be ground.

11. In a drill grinding apparatus, the combination with a grinding wheel and its axis of an arm swingable about an axis which is parallel to the axis of the wheel, said arm being arranged at an angle to the axis about which it swings and extending transversely across the plane of rotation of the wheel, an elongated chuck-holder supported by the arm alongside the same, a pivotal connection between those extremities of the arm and holder most remote from the axis about which the arm swings whereby the end of the holder nearest the last-mentioned axis may be moved upwardly and downwardly with respect to the same, means including a sliding device actuated by a graduated wheel for moving the holder about its pivot to a definite angular position depending on the size of the drill to be ground, and means associated with the holder for securing the drill to be ground.

12. In a drill grinding apparatus, the combination with a grinding wheel and its axis of an arm swingable about an axis which is parallel to the axis of the wheel, said arm being arranged at an angle to the axis about which it swings and extending transversely across the plane of rotation of the wheel, an elongated chuck-holder supported by the arm alongside the same, a pivotal connection between those extremities of the arm and holder most remote from the axis about which the arm swings whereby the end of the holder nearest the last-mentioned axis may be moved upwardly and downwardly with respect to the same, a member shiftable between the axis about which the arm is swingable and the pivotal connector between the arm and holder to vary the angular relation between the arm and holder, turnable means for shifting said member, and means associated with said holder for securing the drill to be ground.

In testimony whereof, I have hereunto set my hand this 25th day of January, 1923.

CHARLES RABUT.